(12) United States Patent
Bohrer et al.

(10) Patent No.: US 12,302,792 B2
(45) Date of Patent: May 20, 2025

(54) DRIVE ARRANGEMENT OF A CONDITIONING APPARATUS OF A FORAGE HARVESTER HAVING AN ELECTRICAL DRIVE TRAIN

(71) Applicant: DEERE & COMPANY, Moline, IL (US)

(72) Inventors: Stefan Bohrer, St.Wendel (DE); Gerd Schoerry, Blieskastel (DE); Georg Kormann, Zweibruecken (DE)

(73) Assignee: DEERE & COMPANY, Moline, IL (US)

( * ) Notice: Subject to any disclaimer, the term of this patent is extended or adjusted under 35 U.S.C. 154(b) by 631 days.

(21) Appl. No.: 17/658,103

(22) Filed: Apr. 6, 2022

(65) Prior Publication Data

US 2022/0377979 A1 Dec. 1, 2022

(30) Foreign Application Priority Data

May 26, 2021 (DE) .......................... 102021113626.1

(51) Int. Cl.
| | | |
|---|---|---|
| A01D 43/08 | (2006.01) | |
| A01D 69/02 | (2006.01) | |
| A01D 82/00 | (2006.01) | |
| A01D 82/02 | (2006.01) | |
| H02P 3/14 | (2006.01) | |
| A01D 45/02 | (2006.01) | |
| A01D 69/10 | (2006.01) | |

(52) U.S. Cl.
CPC ......... *A01D 43/085* (2013.01); *A01D 43/081* (2013.01); *A01D 69/02* (2013.01); *A01D 82/02* (2013.01); *H02P 3/14* (2013.01); *A01D 45/02* (2013.01); *A01D 69/10* (2013.01)

(58) Field of Classification Search
CPC .... A01D 43/085; A01D 43/081; A01D 45/02; A01D 69/02; A01D 69/10; A01D 82/02; H02P 3/14
See application file for complete search history.

(56) References Cited

U.S. PATENT DOCUMENTS

| | | | |
|---|---|---|---|
| 6,425,232 B1* | 7/2002 | Desnijder | A01D 82/02 56/16.4 B |
| 9,867,333 B2* | 1/2018 | Cleodolphi | A01D 34/66 |
| 2019/0233216 A1* | 8/2019 | Van Holthe Tot Echten | B65G 23/08 |
| 2021/0259155 A1* | 8/2021 | Peterson | A01F 15/106 |

FOREIGN PATENT DOCUMENTS

| | | |
|---|---|---|
| DE | 8302421 U1 | 12/1985 |
| DE | 10030505 A1 | 1/2002 |
| DE | 102007018885 A1 | 10/2008 |
| DE | 102010002509 A1 | 9/2011 |

(Continued)

*Primary Examiner* — Adam J Behrens
*Assistant Examiner* — Robert E Pezzuto

(57) ABSTRACT

A drive arrangement of a conditioning apparatus of a forage harvester having two conditioning rollers, with at least one of the conditioning rollers able to be driven at variable speed via an electrical drive train, includes an electric motor/generator for driving the conditioning roller. The electric motor/generator is able to be operated as a generator for braking the conditioning roller and to return the generated electrical energy into a drive system of the forage harvester.

13 Claims, 3 Drawing Sheets

(56) References Cited

FOREIGN PATENT DOCUMENTS

| | | |
|---|---|---|
| DE | 102013110636 A1 | 3/2015 |
| DE | 102016211570 A1 | 12/2017 |
| DE | 102018205221 A1 | 10/2019 |
| DE | 102018213215 A1 | 2/2020 |
| DE | 102019123947 A1 | 10/2020 |
| EP | 2232978 A1 | 9/2010 |
| EP | 2361495 A1 | 8/2011 |
| EP | 2587662 A2 | 5/2013 |
| EP | 2982232 A2 | 2/2016 |
| EP | 3542610 A1 | 9/2019 |
| EP | 3646703 A1 | 5/2020 |
| EP | 3704930 A1 | 9/2020 |
| WO | WO2001047342 A1 | 7/2001 |

* cited by examiner

DRIVE ARRANGEMENT OF A CONDITIONING APPARATUS OF A FORAGE HARVESTER HAVING AN ELECTRICAL DRIVE TRAIN

CROSS-REFERENCE TO RELATED APPLICATIONS

This application claims the benefit of German Patent Application No. 102021113626.1, filed on May 26, 2021, the disclosure of which is hereby incorporated by reference.

TECHNICAL FIELD

The disclosure generally relates to a drive arrangement of a conditioning apparatus of a forage harvester having two conditioning rollers, wherein at least one of the conditioning rollers is able to be driven at variable speed via an electrical drive train.

BACKGROUND

Forage harvesters serve for harvesting whole plants or parts thereof, which are picked up from a field by means of a harvesting attachment during operation, compressed by a pressing rollers and supplied to a knife drum, the chopping knives thereof comminuting the plants in cooperation with a stationary knife. Subsequently, the comminuted plants or plant parts are optionally supplied to a conditioning apparatus and conveyed by a post-accelerator into an ejector elbow which loads the plants or plant parts onto a transport vehicle. The harvested plants generally serve as animal feed or for biogas generation.

The conditioning apparatus comprises two or more cooperating rollers which are driven in opposing directions and which are pretensioned relative to one another by a spring force or which are fixedly attached to one another, the chopped crops being guided therebetween. The conditioning apparatus is used during maize harvesting in order to beat the kernels contained in the chopped crops and to improve the digestibility of the feed. The rollers of the conditioning apparatus are generally provided with teeth or edges extending in the axial direction, so that a non-circular, profiled cross section of the rollers is obtained (see, for example, DE 83 02 421 U1).

In such substantially cylindrical conditioning rollers, in order to change the degree of influence on the harvested crops, generally the relative speed of both conditioning rollers is varied, to which end in the simplest case the belt pulleys of the common drive train of one or both conditioning rollers, derived from the drive of a post-accelerator (see DE 10 2010 002 509 A1), are exchanged for belt pulleys of a different diameter.

In order to vary the speed from the cab of the forage harvester during ongoing operation, it has been proposed to drive one of the conditioning rollers with an electric or hydraulic motor, whilst the other conditioning roller is driven via a purely mechanical drive train (WO 2001/047342 A1), or to drive both conditioning rollers with one respective electric motor at variable speed (DE 10 2018 205 221 A1). The electrical drive permits a simple speed adjustment without excessive effort, which is otherwise required for mechanical drives with variable transmission (see DE 10 2013 110 636 A1, DE 10 2016 211 570 A1, DE 10 2019 123 947 A1).

The electrical drives of one or both conditioning rollers permit, as mentioned above, a variation in the relative speed of both conditioning rollers which is relatively simple to implement. In the prior art, it is provided that the electric motor or the electric motors run with an adjustable speed in harvesting mode, wherein it is assumed therefrom that they always require a certain drive power.

In the meantime, however, it has been surprisingly observed that there are certain operating conditions in which the slower conditioning roller does not have to be driven but has to be braked in order to prevent it from running more rapidly than desired. Such conditions were not taken into account in the previous prior art.

SUMMARY

A drive arrangement of a conditioning apparatus of a forage harvester having two conditioning rollers is provided. At least one of the conditioning rollers is able to be driven at variable speed via an electrical drive train. The electrical drive train includes an electric motor/generator for driving the conditioning roller, said electric motor/generator being able to be operated as a generator for braking the conditioning roller. The generated electrical energy is able to be returned into the drive system of the forage harvester.

In this manner, the aforementioned operating conditions in which the conditioning roller has to be braked in order to achieve the desired speed are taken into account. By using the electric motor/generator as the generator in these operating conditions, the situation is avoided that the electrically driven conditioning roller is simply pulled along and rotates more rapidly than desired, which impairs the desired conditioning action, without the braking energy having to be converted into heat in a resistor in order to achieve the braking action. Instead, the braking energy is directly or indirectly returned into the drive system of the forage harvester. Thus, the overall efficiency of the electrical drive train is improved thereby.

The electric motor/generator is able to be supplied with electrical current by a transducer and the transducer may be connected to control electronics which in turn are connected to a speed sensor for detecting the speed of the conditioning roller, which is able to be driven at variable speed, and which are configured to command the transducer to permit the electric motor/generator to rotate at a predeterminable target speed. Accordingly, this is a closed-loop control system with feedback of the obtained speed. The speed sensor, which may be implemented in any manner, may be integrated in the housing of the motor/generator or arranged outside thereof and cooperate, for example, with the shaft of the conditioning roller. The speed sensor may also be an electronics system which detects the speed of the motor/generator using the electromotive force induced in its windings, see EP 2 587 662 A2. In a further embodiment, a controller could be used with an open feedback loop which operates without feedback of the speed by means of a sensor, i.e. the electric motor/generator is electrically activated using known characteristics, such that the desired speed is produced.

Using electrical operating values of the electric motor/generator and/or the signal of the speed sensor, the control electronics may be configured to identify that a braking of the conditioning roller is required in order to maintain the target speed and in this case to command the transducer to operate the electric motor/generator as a generator. In other words, using operating values returned to the control electronics by the transducer, for example of the received current intensity and/or the speed of the conditioning roller, the control electronics identifies the situation where the electric motor/generator is not actively driving the conditioning roller but the conditioning roller is rotating freely or is even driven by the harvested crop flow. At least in the second case, the described braking mode is activated in order to achieve the desired speed of the conditioning roller and to return the braking energy to the drive system of the forage harvester.

The electrical drive train of the conditioning roller may include a generator which is connected to the electric motor/generator via a power line and which is connected in terms of drive to an internal combustion engine. The generator may be arranged at any point of the drive system of the forage harvester, for example on a post-accelerator drive shaft or on the shaft of the respective other conditioning roller.

The drive of the respective other conditioning roller may be carried out via a mechanical drive train. In this embodiment, the generator may be a generator/electric motor which, in braking mode of the electric motor/generator, is able to be operated as an electric motor which is able to be driven by the recuperated braking energy of the electric motor/generator and returns the braking energy (on a direct path) to the drive system of the forage harvester.

In a further embodiment, the drive of the other conditioning roller may be carried out via an electrical drive train, the recuperated braking energy of the electric motor/generator being able to be supplied thereto in braking mode of the electric motor/generator. In this embodiment, when the braking conditioning roller is used for the recuperation, the drive system of the forage harvester has to supply less power to the electrical drive train of the other conditioning roller than would be the case without the supplied recuperation power, which ultimately returns the braking energy (on an indirect path) to the drive system of the forage harvester.

The control electronics may be connected to a user interface which is designed for the input of a speed difference of the conditioning rollers and may be configured to calculate the target speed of the conditioning roller driven via the electrical drive train using the input speed difference and a speed of the other conditioning roller detected by sensor.

Alternatively or additionally, the control electronics may be connected to a sensor system for identifying cracked kernels and/or harvested crop properties such as moisture, throughput and/or kernel contents, and are configured to calculate the target speed of the conditioning roller driven via the electrical drive train using the output signal of the sensor system.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
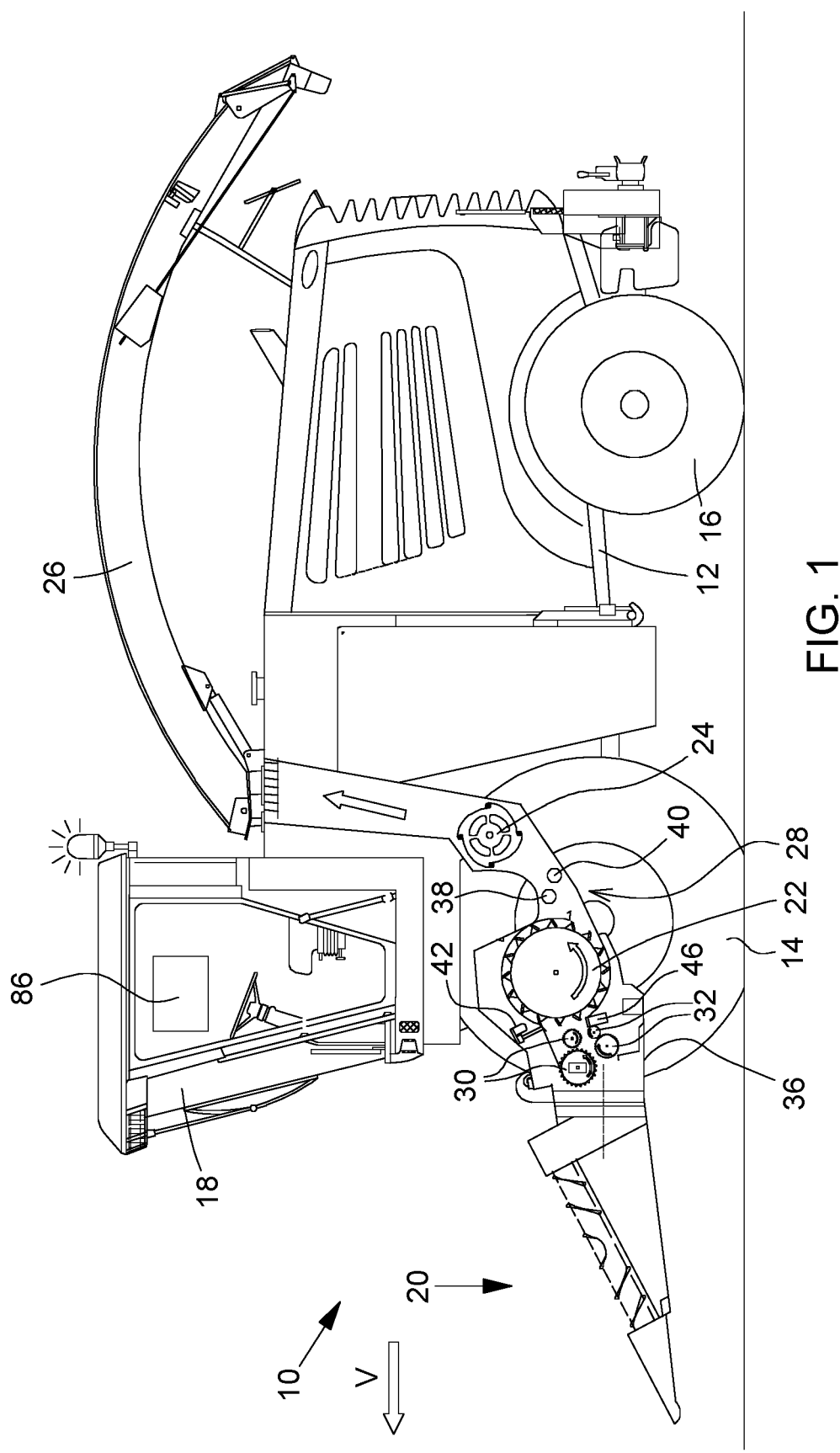
FIG. 1 is a schematic side view of a forage harvester.

Referring to the Figures, wherein like numerals indicate like parts throughout the several views, a self-propelled forage harvester is generally shown at 10 in FIG. 1. The forage harvester 10 is constructed on a load-bearing chassis 12 which is borne by front driven wheels 14 and steerable rear wheels 16. The operation of the forage harvester 10 is carried out from a driver's cab 18, from which a harvesting attachment 20 in the form of a cutter attachment for harvesting maize, which is releasably fastened to an intake housing 36, may be seen. Harvested crops which are cut by means of the harvesting attachment 20, for example maize or the like, are supplied on the front side of the forage harvester 10 via an intake conveyor with pressing rollers 30, 32, which are arranged in the intake housing 36, to a chopping drum 22 which in cooperation with a counter-cutting blade 46 chops said harvested crops into small pieces and discharges them to a conditioning apparatus 28 having cooperating conditioning rollers 38, 40, from where it passes to a conveying device 24. The conditioning rollers 38, 40 may be designed as cylindrical rollers which are toothed in the circumferential direction or designed to be wave-shaped in the axial direction. The crops exit the forage harvester 10 to a transport vehicle driving alongside via an ejection elbow 26 which is rotatable about an approximately vertical axis and which is adjustable in terms of inclination. The knives of the chopping drum 22 may be sharpened by a sharpening apparatus 42. Hereinafter, directional information such as laterally, downwardly and upwardly refers to the forward direction of movement V of the forage harvester 10 which runs to the left in FIG.

Figure 2:
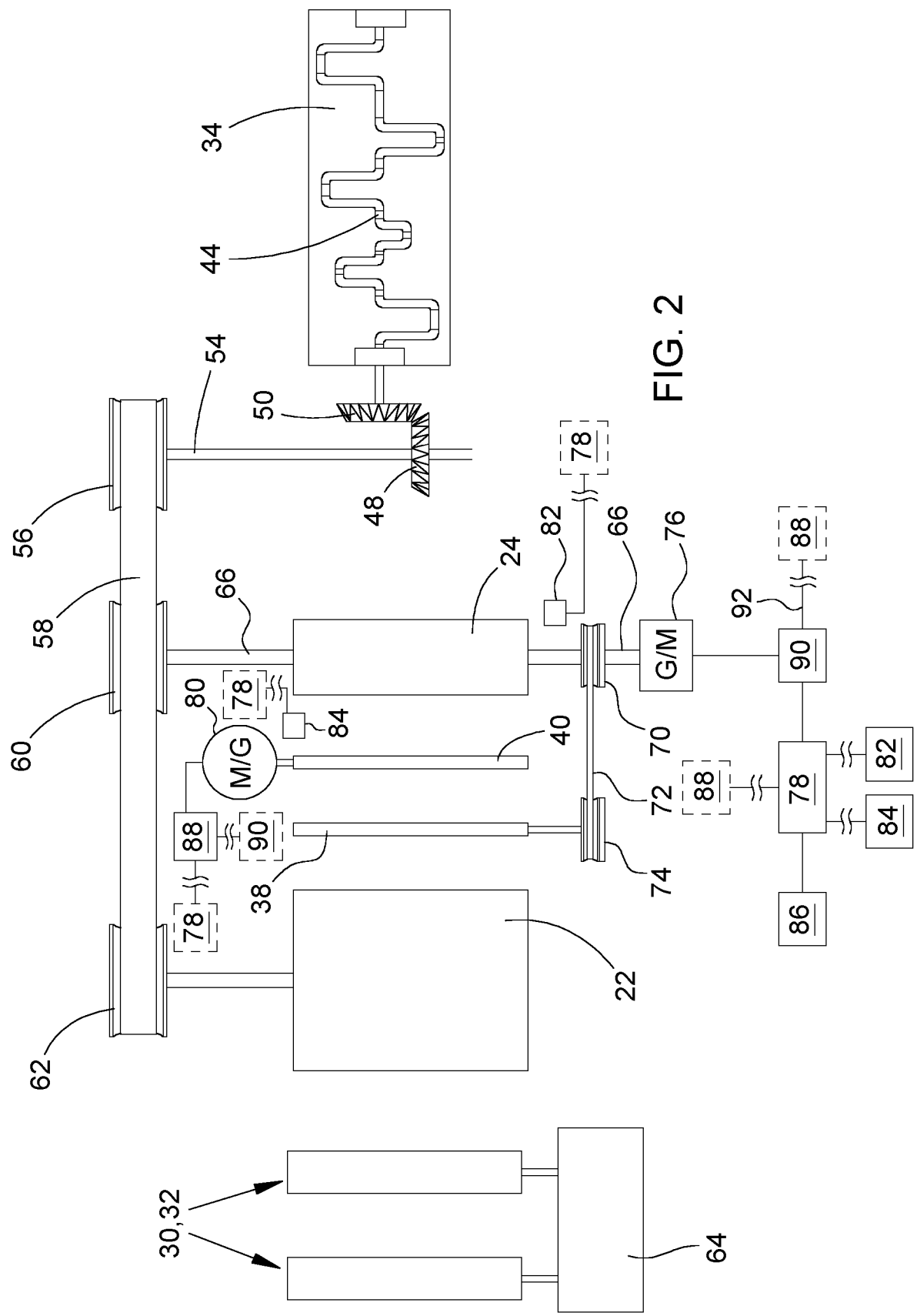
FIG. 2 is a schematic plan view of a first embodiment of a drive system of the forage harvester and a conditioning apparatus of the forage harvester.

FIG. 2 shows a plan view of a first embodiment of a drive system of the forage harvester 10. An internal combustion engine 34, in particular in the form of a diesel engine, is located in the rear region of the harvester 10. The internal combustion engine 34 extends in the forward direction of the harvesting machine 10 and comprises a crankshaft 44 which extends to the front out of the housing of the internal combustion engine 34. During operation, the internal combustion engine 34 drives via its crankshaft 44 a first longitudinal shaft which is connected to the first bevel gear 50 of a bevel gearbox. The second bevel gear 48 of the bevel gearbox is connected to a transverse shaft 54 which is coupled to a belt pulley 56 of the main belt drive, which via a belt 58 drives a belt pulley 60 and a belt pulley 62. The belt pulley 62 drives the shaft of the chopping drum 22, whilst the belt pulley 60 drives a post-accelerator drive shaft 66 which in turn drives the post-accelerator 24 and (via a drive arrangement according to the invention) the conditioning rollers 38, 40. The drive of the pressing rollers 30, 32 is carried out via a gearbox 64 which may be driven by the internal combustion engine 34 via a hydraulically, electrically and/or mechanically designed drive train (not shown).

The front upper conditioning roller 38 is driven via a belt drive from the post-accelerator drive shaft 66 which—as shown in FIG. 2—may be located on the side of the post-accelerator 24 remote from the belt 58, but also could be arranged on the side of the post-accelerator 24 adjacent to the belt 58. This belt drive comprises a belt pulley 70 which is connected fixedly in terms of rotation to the post-accelerator drive shaft 66 and about which a belt 72 which drives a belt pulley 74 circulates, said belt pulley in turn being connected in terms of drive to the front upper conditioning roller 38. The belt 58 could be tightened by a clamping roller, not shown. Since the post-accelerator 24 and the front upper conditioning roller 38 convey in an undershot manner and thus rotate in the same direction (counterclockwise in FIG. 1), with this belt drive a reversal of the rotational direction is superfluous, in contrast to the rear lower conditioning roller 40.

The drive of the lower rear conditioning roller 40 is carried out by an electric motor/generator 80 and a generator/electric motor 76, said generator/electric motor 76 being connected to the post-accelerator drive shaft 66 in a torque-transmitting manner. The generator 76 could also be connected in terms of drive directly or indirectly to the crankshaft 44 at any other point of the drive train shown, for example to the shaft of the front upper conditioning roller 38, and could be arranged on the same side of the conditioning roller 38 on which the electric motor/generator 80 is located. The generator/electric motor 76 could also be a component of the on-board power system or a further electrical network of the forage harvester 10, for example for driving the gearbox 64 of the pressing rollers 30, 32, which could be buffered by a battery. The generator/electric motor 76 is electrically connected to a first transducer 90 which is connected by a power line 92 to a second transducer 88. The second transducer 88 is in turn connected electrically to the electric motor/generator 80. The drive power for the electric motor/generator 80 is electrically transmitted by the power line 92. In this case, it is direct current at a specific voltage or alternating current or three-phase current at a specific voltage and frequency. The power line is also denoted in technical terminology as a "bus". Control electronics 78 are connected to a first speed sensor 82 for detecting the speed of the post-accelerator drive shaft 66, a second speed sensor 84 for detecting the speed of the electric motor/generator 80 and a user interface 86 for the input of a desired speed difference between the conditioning rollers 38, 40.

The mode of operation of the drive train of the conditioning rollers 38, 40 is as follows: in harvesting mode the internal combustion engine 34 drives the post-accelerator drive shaft 66. Via the belt drive the front upper conditioning roller 38 is driven by the belt 72 at a specific speed which depends on the speed of the crankshaft 44 of the internal combustion engine 34 and is detected by the first speed sensor 82. Initially, i.e. when accelerating the lower rear conditioning roller 40, the generator/electric motor 76 is operated as a generator, i.e. it delivers electrical current which is brought by the first transducer 90 into a form which may be transmitted by the power line 92. The second transducer 88 obtains this electrical current via the power line 92 and converts this into electrical current in a form which is able to be received by the electric motor/generator 80. The second transducer 88 accordingly supplies the electric motor/generator 80 with electrical current for the active drive thereof or, when the electric motor/generator 80 serves as a generator, obtains electrical current therefrom.

The generator/electric motor 76 and the electric motor/generator 80 are electrical machines which may be used both as electric motors and as generators, for example DC motors or three-phase motors with rotating permanent magnets (IPM motor).

The first and second transducers 90, 88 are activated by the control electronics 78 on the basis of the signals from the speed sensors 82 and 84 and the desired speed difference input via the user interface 86, such that the electric motor/generator 80 actively drives the lower rear conditioning roller 38 when it is accelerated at an initially increasing speed until a target speed is reached. This target speed corresponds to the speed of the upper front conditioning roller 38 minus the desired speed difference input, for example, via the user interface 86. The lower rear conditioning roller 40 is thus driven at a lower speed than the upper front conditioning roller 38. With conditioning rollers 38, 40 of different diameter, the circumferential speed of the lower rear conditioning roller 40 might be less than the circumferential speed of the upper front conditioning roller 38.

Provided no harvested crops pass through the forage harvester 10, the lower rear conditioning roller 40 may be actively driven with relatively little power. If harvested crops now pass through the forage harvester 10 and between the conditioning rollers 38, 40, an operating condition may be present in which the lower rear conditioning roller 40 does not have to be actively driven but has to be braked. This is because the upper front conditioning roller 38 acts relatively powerfully on the harvested crops and pulls along the harvested crops and an active drive of the lower rear conditioning roller 40 is no longer required, and this lower rear conditioning roller has to be braked, however, if the desired speed is intended to be maintained.

The control electronics 78 identifies this condition in which the electric motor/generator 80 no longer has to be actively driven to achieve the desired speed, but rotates freely or even has to be braked using the electrical braking values of the electric motor/generator 80, for example using the current intensity received thereby (which is communicated from the second transducer 88 back to the control electronics 78) and/or the speed detected by the speed sensor 84. As soon as said condition is identified, i.e. the desired speed is exceeded and a downward adjustment of the supply voltage or supply current supplied to the electric motor/generator 80 does not lead to the desired speed, the control electronics 78 switches to a braking mode in which the control electronics 78 commands the transducer 90, 88 to operate the electric motor/generator 80 as a generator and to operate the generator/electric motor 76 as a motor. The energy transmission takes place in braking mode, thus in the reverse direction from when accelerating the lower rear conditioning roller 40, namely now from the conditioning roller 40 to the post-accelerator drive shaft 66. The power released by the required braking of the conditioning roller 40 is recuperated and returned to the drive train of the forage harvester 10 (however it could also be buffered in a battery) which then reduces the fuel consumption of the internal combustion engine 34 and increases the drive power available to the chopping drum 22 and other elements to be driven, relative to a nascent conversion of the braking energy into heat in a resistor, which is otherwise required for maintaining the desired speed of the conditioning roller 40. The electrical drive train of the conditioning roller 40 of FIG. 2 thus achieves substantially the same energy footprint as a purely mechanical drive train, but permits a free choice of the speed of the conditioning roller 40 and thus of the degree of influence on the harvested crops and thus also the kernel cracking.

According to the above description, the motor function of the electric motor/generator 80 is required for increasing the speed of the conditioning roller 40. It might be conceivable to dispense therewith and simply to permit the conditioning roller 40 to rotate freely or to brake said conditioning roller, but blockages could result initially, i.e. with the start-up of harvesting mode, with a stationary conditioning roller 40 and the harvested crops initially passing therein. Moreover, with specific throughput quantities and speed differences, an active drive of the conditioning roller 40 may also be required in order to achieve the desired speed of the conditioning roller 40.

Figure 3:
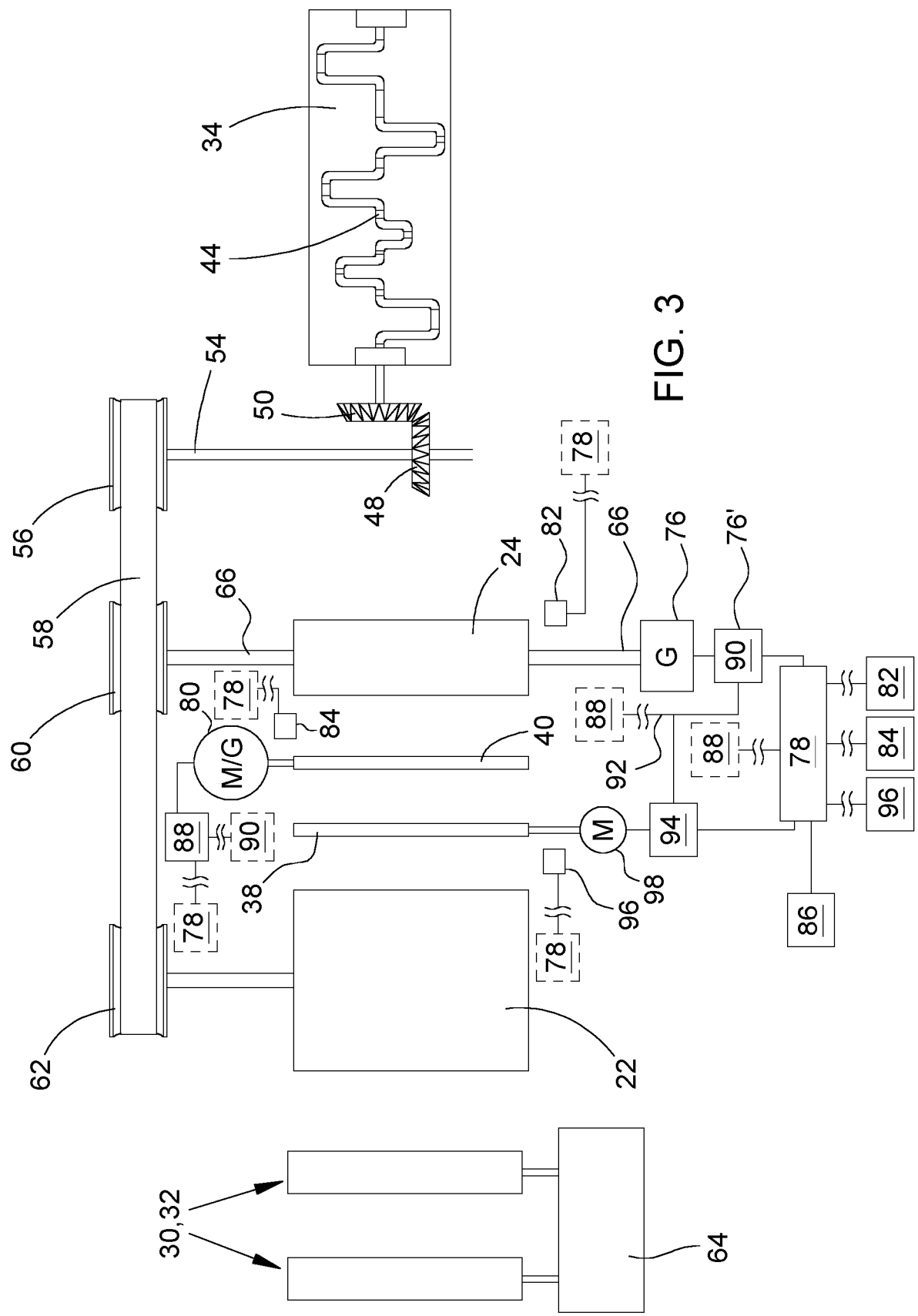
FIG. 3 is a schematic plan view of a second embodiment of the drive system of the forage harvester and the conditioning apparatus.

The embodiment according to FIG. 3 corresponds to that of FIG. 2 relative to the lower rear conditioning roller 40, but also uses an electrical drive for the upper front conditioning roller 38. Thus the power line 92 is also connected to a third transducer 94 which supplies an electric motor 98 which drives the conditioning roller 38. A third speed sensor 96 detects the speed of the electric motor 98. In harvesting mode the control unit 78 controls the third transducer 94 such that a speed of the conditioning roller 38, which is fixedly predetermined or input via the user interface apparatus 86, is achieved by using the signals of the third speed sensor 96. The speed regulation of the lower rear conditioning roller 40 is carried out in the manner described relative to FIG. 2. In the braking mode of the conditioning roller 40, the recovered, recuperated power of the conditioning roller 40 is supplied to the electric motor 98. In the embodiment according to FIG. 3, in principle the first speed sensor 82 could be dispensed with. In this case, the electric motor 98 does not have to be used as a generator so that here it may be a simple motor and the transducer 94 does not need to be capable of recuperation. Moreover, in this embodiment the generator/electric motor 76 of FIG. 2 may be designed as a simple generator 76' since here the recuperation power is supplied (only) to the electric motor 98. Thus in this case the first transducer 90 also does not need to be designed to operate the generator 76' as an electric motor.

It should also be mentioned that different modifications are possible. Thus, the drives of the conditioning rollers 38 and 40 in the embodiments according to FIGS. 2 and 3 could be interchanged. In this case, the lower rear conditioning roller 40 could be the one driven more rapidly (at greater circumferential speed), and the upper front conditioning roller 38 would optionally be braked with a recuperation of the braking energy. In the case of a mechanical drive of the conditioning roller 40 a further gearbox might be incorporated here in the belt drive for reversing the rotational direction (see DE 10 2016 211 570 A1).

Moreover, there is the possibility of permitting the situation where the speed difference is not input by the operator but the cracked kernels and/or specific harvested crop properties (such as moisture, throughput and/or kernel proportion) are identified downstream of the conditioning rollers 38, 40 by means of a sensor system at any point of the harvested crop flow in the forage harvester 10, and are used for regulating the speed difference. To this end, reference might be made to EP 2 232 978 A1, EP 2 982 232 A2, EP 3 646 703 A1, DE 10 2018 213 215 A1 and EP 3 704 930 A1 for identifying the cracked kernels and DE 100 30 505 A1, DE 10 2007 018 885 A1, EP 2 361 495 A1 and EP 3 542 610 A1 for considering harvested crop properties, the disclosures thereof being incorporated by way of reference in the present documentation. Moreover, in the embodiment according to FIG. 3 the speed of the conditioning roller 38 may be dependent on the speed of the chopping drum 22, for which reference might be made to the disclosure of DE 10 2018 205 221 A1. Irrespective thereof, in the embodiment according to FIG. 3 the electrical drive of both conditioning rollers 38, 40 makes it possible to select the speed of the conditioning rollers 38, 40 and the speed difference thereof, independently of the speed of the internal combustion engine 34. In this arrangement, therefore, a uniform acceleration of the harvested crops in the conditioning apparatus 28, which is adapted to the throughput and which is independent of the speed of the internal combustion engine 34, is possible.

In the embodiment according to FIG. 3, a measurement of the operating values of the electric motor 98 and the electric motor/generator 80, together with knowledge of the spacing between the conditioning rollers 38, 40, permits an accurate determination of the respective mass flow.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A drive arrangement of a conditioning apparatus of a forage harvester provided with two conditioning rollers, wherein at least one of the conditioning rollers is able to be driven at variable speed via an electrical drive train, wherein the drive arrangement comprises:
   an electric motor/generator for driving the conditioning roller, said electric motor/generator being able to be operated as a generator for braking the conditioning roller, wherein the generated electrical energy is able to be returned into the drive system of the forage harvester; and
   wherein the electrical drive train of the conditioning roller includes a generator which is connected to the electric motor/generator via a power line and which is connected in terms of drive to an internal combustion engine.

2. The drive arrangement set forth in claim 1, wherein the electric motor/generator is able to be supplied with electrical current by a transducer and the transducer is connected to control electronics which in turn are connected to a speed sensor for detecting the speed of the conditioning roller, which is able to be driven at variable speed, and which are configured to command the transducer to permit the electric motor/generator to rotate at a predeterminable target speed.

3. The drive arrangement set forth in claim 2, wherein using electrical operating values of the electric motor/generator and a signal of the speed sensor, the control electronics are configured to identify that a braking of the conditioning roller is required in order to maintain the target speed and in this case to command the transducer to operate the electric motor/generator as a generator.

4. The drive arrangement set forth in claim 1, further comprising a mechanical drive train for driving the other conditioning roller, and wherein the generator is a generator/electric motor which, in braking mode of the electric motor/generator, is able to be operated as an electric motor which is able to be driven by a recuperated braking energy of the electric motor/generator and returns the braking energy to the drive system of the forage harvester.

5. The drive arrangement set forth in claim 1, wherein the electrical drive train is configured for driving the other conditioning roller, with a recuperated braking energy of the electric motor/generator being able to be supplied thereto in braking mode of the electric motor/generator.

6. The drive arrangement set forth in claim 2, wherein the control electronics are connected to a user interface for receiving a speed difference input of the conditioning rollers and are configured to calculate the target speed of the conditioning roller driven via the electrical drive train using the speed difference input and a speed of the other conditioning roller detected by a sensor.

7. The drive arrangement set forth in claim 2, wherein the control electronics are connected to a sensor system for identifying cracked kernels and/or harvested crop properties and are configured to calculate the target speed of the conditioning roller driven via the electrical drive train using an output signal of the sensor system.

8. A forage harvester comprising:
   an internal combustion engine operable to generate torque;
   a first conditioning roller and a second conditioning roller arranged in spaced parallel relationship with each other for receiving crop therethrough;
   a first electric motor/generator coupled to the internal combustion engine and the first conditioning roller for communicating torque therebetween, wherein the first electric motor/generator is configured to operate as an electric motor to generate and supply torque to the first conditioning roller and the internal combustion engine when supplied with electric energy, and wherein the first electric motor/generator is configured to operate as an electric generator to generate electric energy when supplied with torque;
   a second electric motor/generator coupled to the second conditioning roller for torque communication therebetween, and the first electric motor/generator for communicating electric energy therebetween, wherein the second electric motor/generator is configured to operate as an electric motor to generate torque and rotate the second conditioning roller when supplied with electric energy from the first electric motor/generator, and wherein the second electric motor/generator is configured to operate as a generator to brake the second conditioning roller and provide electric energy to the first electric motor/generator;
   a control electronics and a transducer coupled to the first electric motor/generator, wherein the control electronics is operable to control the transducer which in turn controls the operation of the first electric motor/generator; and
   a post accelerator functionally disposed between the internal combustion engine and the first electric motor/generator for transmitting torque therebetween.

9. The forage harvester set forth in claim 8, further comprising a control electronics and a transducer coupled to the second electric motor/generator, wherein the control electronics is operable to control the transducer which in turn controls the operation of the second electric motor/generator.

10. The forage harvester set forth in claim 9, further comprising a speed sensor in communication with the control electronics and configured for sensing a rotational speed of the second conditioning roller.

11. The forage harvester set forth in claim 8, wherein the post accelerator includes a drive shaft that is rotatable in response to torque, wherein the first conditioning roller is coupled to and driven by the drive shaft of the post accelerator.

12. The forage harvester set forth in claim 11, wherein the first electric motor/generator is coupled to the drive shaft of the post accelerator.

13. The forage harvester set forth in claim 11, further comprising a speed sensor in communication with the control electronics and configured for sensing a rotational speed of the drive shaft of the post accelerator.

* * * * *